United States Patent
Husemann et al.

(10) Patent No.: US 7,514,142 B2
(45) Date of Patent: Apr. 7, 2009

(54) PRESSURE-SENSITIVE ADHESIVE TAPE FOR LCDS

(75) Inventors: Marc Husemann, Hamburg (DE); Reinhard Storbeck, Hamburg (DE)

(73) Assignee: tesa Ag, Hamburg (DE)

( * ) Notice: Subject to any disclaimer, the term of this patent is extended or adjusted under 35 U.S.C. 154(b) by 0 days.

(21) Appl. No.: 10/528,291

(22) PCT Filed: Aug. 20, 2003

(86) PCT No.: PCT/EP03/09195

§ 371 (c)(1),
(2), (4) Date: Oct. 5, 2005

(87) PCT Pub. No.: WO2004/028797

PCT Pub. Date: Apr. 8, 2004

(65) Prior Publication Data
US 2006/0035077 A1      Feb. 16, 2006

(30) Foreign Application Priority Data
Sep. 17, 2002   (DE) ............................... 102 43 215

(51) Int. Cl.
*B32B 7/12* (2006.01)
(52) U.S. Cl. .................. 428/354; 428/343; 428/344; 428/41.8
(58) Field of Classification Search .............. 428/344, 428/343, 354
See application file for complete search history.

(56) References Cited

U.S. PATENT DOCUMENTS

| | | | |
|---|---|---|---|
| 4,581,429 A | 4/1986 | Solomon et al. | |
| 5,441,809 A * | 8/1995 | Akhter | ............ 428/354 |
| 5,789,487 A | 8/1998 | Matyjaszewski et al. | |
| 5,854,364 A | 12/1998 | Senninger et al. | |
| 5,939,190 A * | 8/1999 | Pfaff et al. | ................ 428/344 |
| 5,945,491 A | 8/1999 | Matyjaszewski et al. | |
| 2003/0071941 A1* | 4/2003 | Mizuno | .................... 349/96 |
| 2004/0028895 A1* | 2/2004 | Yamakami et al. | .......... 428/354 |
| 2004/0121148 A1* | 6/2004 | Miyano et al. | ............. 428/354 |
| 2005/0163995 A1* | 7/2005 | Yokoyama et al. | .......... 428/343 |

FOREIGN PATENT DOCUMENTS

| | | |
|---|---|---|
| EP | 0 735 052 A3 | 10/1996 |
| EP | 0 824 110 A1 | 2/1998 |
| EP | 0 824 111 A1 | 2/1998 |

(Continued)

OTHER PUBLICATIONS

Machine translations of the Claims and Detailed Descriptions, together with the Abstracts of JP 2002-249741 and 10-152658.*

*Primary Examiner*—Hai Vo
*Assistant Examiner*—Anish Desai
(74) *Attorney, Agent, or Firm*—Norris McLaughlin & Marcus PA

(57) ABSTRACT

The invention relates to a pressure-sensitive adhesive tape, particularly for producing LCD displays, comprising two surfaces while also being provided with at least one support having two supporting surfaces and a pressure-sensitive layer on each of the two supporting surfaces. The invention is characterized in that at least one of the two surfaces of the pressure-sensitive adhesive tape has silvery reflective properties.

3 Claims, 2 Drawing Sheets

FOREIGN PATENT DOCUMENTS

| | | |
|---|---|---|
| EP | 0 826 698 A1 | 3/1998 |
| EP | 0 841 346 A1 | 5/1998 |
| EP | 0 850 957 A1 | 7/1998 |
| EP | 1 211 298 A | 6/2002 |
| EP | 1211298 A2 * | 6/2002 |
| JP | 10 152658 | 6/1998 |
| WO | WO 96/24620 | 8/1996 |
| WO | WO 98/13392 | 4/1998 |
| WO | WO 98/44008 | 10/1998 |
| WO | WO 02/066570 | 8/2002 |

* cited by examiner

PRESSURE-SENSITIVE ADHESIVE TAPE FOR LCDS

This application is a 371 of PCT/EP2003/009195, filed Aug. 20, 2003.

The invention relates to a double-sided pressure-sensitive adhesive tape, particularly for producing LCD displays, having two surfaces, further equipped with at least one carrier having two carrier surfaces and one pressure-sensitive adhesive layer on each of the two carrier surfaces.

Pressure-sensitive adhesive tapes in the age of industrialization are widespread processing auxiliaries. Particularly for use in the computer industry, very exacting requirements are imposed on pressure-sensitive adhesive tapes. As well as having a low outgassing behavior, the pressure-sensitive adhesive tapes ought to be suitable for use within a wide temperature range and ought to fulfill certain optical properties.

For the production of LCD displays, LEDs, as the light source, are bonded to the LCD glass. Generally, for this purpose, black, double-sided pressure-sensitive adhesive tapes are used. A drawback of this process is that because of the black coloration there is no longer any reflection of light to the light source, with the consequence that the LED light source has to generate significantly more light and hence also requires more energy. In a subsequent development, a double-sided adhesive tape was used that was colored white on one side and black on the other side. This measure significantly increased the light efficiency. The white coloration, however, also has the disadvantage that the scattering of the light is not controlled, there being produced, instead, a quantity of scattered light that cannot be utilized.

For improving the light efficiency, therefore, there continues to be a need for a double-sided pressure-sensitive adhesive tape which does not have the deficiencies specified above, or has them only to a reduced extent.

It is therefore an object of the invention to provide a double-sided pressure-sensitive adhesive tape which exhibits improved light reflection and causes fewer scattering effects.

In general, the present invention relates in a first embodiment to a pressure-sensitive adhesive tape, particularly for producing LCD displays, having two surfaces, further equipped with at least one carrier having two carrier surfaces and one pressure-sensitive adhesive layer on each of the two carrier surfaces, at least one of the two surfaces of the pressure-sensitive adhesive tape having silvery reflecting properties.

In one advantageous embodiment of the pressure-sensitive adhesive tape of the invention the silvery reflecting property of at least one surface of the adhesive tape is achieved by metallizing the corresponding carrier surface.

In another advantageous embodiment of the pressure-sensitive adhesive tape of the invention the silvery reflecting property of at least one surface of the adhesive tape is achieved by coating the corresponding carrier surfaces.

It has proven suitable in the sense of the invention for the silvery reflecting property of at least one surface of the adhesive tape to be achieved by adding silver-colored additives to the pressure-sensitive adhesive layer on the corresponding carrier surface.

It is advantageous, furthermore, if heat-activable pressure-sensitive adhesives (PSAs) are used as the basis for at least one of the pressure-sensitive adhesive layers.

In a further advantageous embodiment of the pressure-sensitive adhesive tape of the invention, transparent pressure-sensitive adhesives (PSAs) are used as the basis for at least one of the pressure-sensitive adhesive layers.

BRIEF DESCRIPTION OF THE DRAWINGS

The invention will now be described in greater detail with reference to the drawings, wherein.

Figure 1:
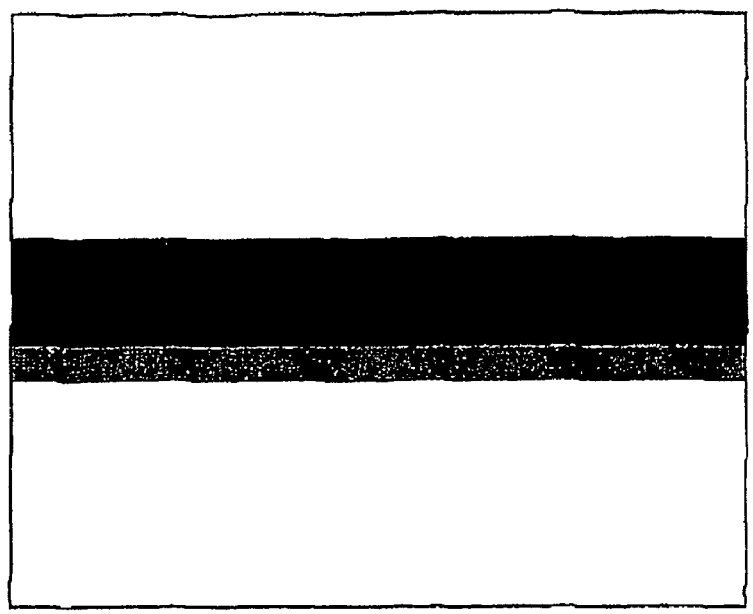
FIG. 1 depicts one embodiment of a pressure-sensitive adhesive tape according to the present invention.

Below, advantageous product structures for the pressure-sensitive adhesive tape of the invention are presented by way of example:

FIG. 1 shows one version of the inventive pressure-sensitive adhesive tape, consisting of a carrier film layer (a), a silver-reflective layer (b), and two pressure-sensitive adhesive layers (c) and (d).

The carrier film layer (a) is preferably between 5 and 250 µm thick and colored black. The layer (b) is of silver coloring and light reflecting. Besides a silver-colored coating, the film (a) may also have been covered with aluminum by vapor deposition. The PSA layers (c) and (d) possess preferably a thickness of 5 µm to 250 µm each.

Figure 2:
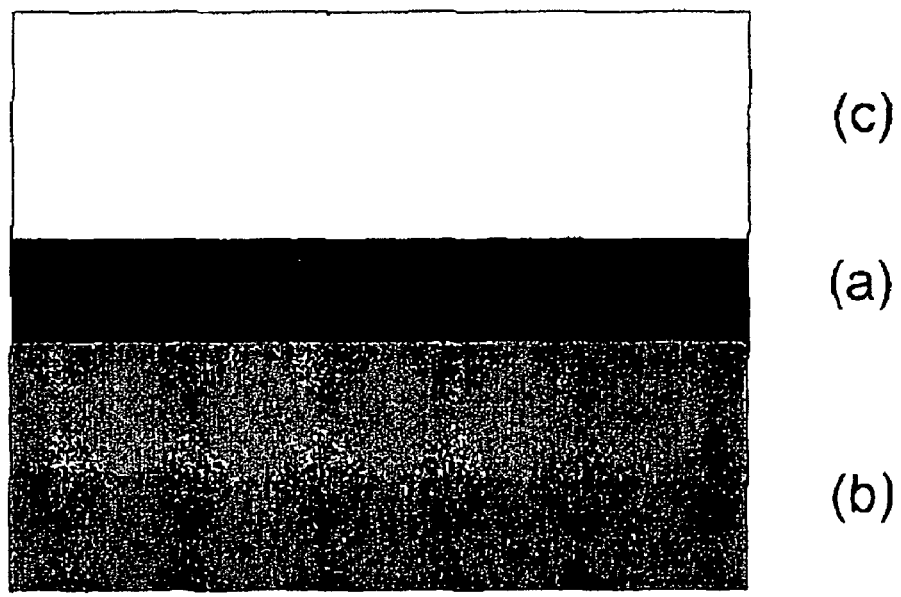
FIG. 2 depicts a second embodiment of a pressure-sensitive adhesive tape according to the present invention.

In another preferred embodiment of the invention the inventive pressure-sensitive adhesive tape possesses the product structure shown in FIG. 2.

In this case the carrier film layer (a) is preferably between 5 and 250 µm thick and colored black. The layer (b) is of silver coloring, is pressure-sensitively adhesive, and light reflecting. This effect is achieved, for example, by compounding PSAs with suitable silver-colored fillers. The PSA layer (c) preferably possesses a thickness of 5 µm to 250 µm.

As film carriers for all embodiments it is possible in principle to use all filmic polymer carriers. Use may be made, by way of example, of PE, PP, oriented PP, polyimide, polyester, polyamide, PVC and PET films. In one very preferred version, PET films are used. For the black coloring of the films they are filled, in one very preferred version, with black pigments.

Particular suitability has been found to be possessed by graphites, carbon blacks or similar carbon compounds. Through the filling fraction it is possible to adjust the transparency (light transmittance) and the degree of black coloration of the film. In an alternative method the film is equipped with a black outer layer. Here, black topcoat materials can be used, or vapor deposition can be carried out with different black-coloring materials. The films can be pretreated for the purpose of improving the anchoring of the PSA. The films may therefore have been etched (trichloroacetic acid), pretreated by corona or plasma, or furnished with a primer (e.g., Saran primer).

For the case of the inventive embodiment according to FIG. 1, the black film is equipped with a silver-reflective layer. This can be done, for example, by coating with a silver-coloring layer (coating material). In one preferred embodiment the black layer is applied by vapor deposition with aluminum.

PSA systems used for the inventive double-sided pressure-sensitive adhesive tape are acrylate, natural rubber, synthetic rubber, silicone and/or EVA adhesives, particular advantage being possessed by the PSAs which have a high transparency.

Furthermore it is possible to process all further PSAs known to the skilled worker, such as, for example, those listed in the "Handbook of Pressure Sensitive Adhesive Technology", by Donatas Satas (van Nostrand, New York 1989).

For natural rubber adhesives the natural rubber is milled to a molecular weight (weight average) of not below about 100 000 daltons, preferably not below 500 000 daltons, and additized.

In the case of rubber/synthetic rubber as starting material for the adhesive, there are wide possibilities for variation, whether from the group of the natural rubbers or the synthetic rubbers, or whether from any desired blend of natural rubbers and/or synthetic rubbers, it being possible for the natural rubber or natural rubbers to be chosen in principle from all available grades, such as, for example, crepe, RSS, ADS, TSR or CV grades, in accordance with the purity level and viscosity level required, and for the synthetic rubber or synthetic rubbers to be chosen from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

With further preference it is possible, in order to improve the processing properties of the rubbers, to add to them thermoplastic elastomers with a weight fraction of 10% to 50% by weight, based on the overall elastomer fraction. As representatives, mention may be made at this point, in particular, of the particularly compatible styrene-isoprene-styrene (SIS) and styrene-butadiene-styrene (SBS) types.

In one inventively preferred embodiment it is preferred to use (meth)acrylate PSAs.

(Meth)acrylate PSAs, which are obtainable by free-radical addition polymerization, consist to the extent of at least 50% by weight of at least one acrylic monomer from the group of the compounds of the following general formula:

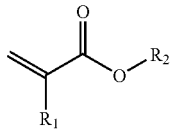

where $R_1$ is H or $CH_3$ and the radical $R_2$ is H or $CH_3$ or is selected from the group of branched or unbranched, saturated alkyl groups having 1-30 carbon atoms.

The monomers are preferably chosen such that the resulting polymers can be used, at room temperature or higher temperatures, as PSAs, particularly such that the resulting polymers possess pressure-sensitive adhesion properties in accordance with the "Handbook of Pressure Sensitive Adhesive Technology" by Donatas Satas (van Nostrand, New York 1989).

In a further inventive embodiment the comonomer composition is chosen such that the PSAs can be used as heat-activable PSAs.

The polymers can be obtained preferably by polymerizing a monomer mixture which is composed of acrylic esters and/or methacrylic esters and/or the free acids thereof, with the formula $CH_2=CH(R_1)(COOR_2)$, where $R_1$ is H or $CH_3$ and $R_2$ is an alkyl chain having 1-20 carbon atoms or is H.

The molar masses $M_w$ of the polyacrylates used amount preferably to $M_w \geq 200\,000$ g/mol.

In one way which is greatly preferred, acrylic or methacrylic monomers are used which are composed of acrylic and methacrylic esters having alkyl groups comprising 4 to 14 carbon atoms, and preferably comprise 4 to 9 carbon atoms.

Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as isobutyl acrylate, 2-ethylhexyl acrylate, 2-ethylhexyl methacrylate, isooctyl acrylate, and isooctyl methacrylate, for example.

Further classes of compound which can be used are monofunctional acrylates and/or methacrylates of bridged cycloalkyl alcohols consisting of at least 6 carbon atoms. The cycloalkyl alcohols can also be substituted, by C-1-6 alkyl groups, halogen atoms or cyano groups, for example. Specific examples are cyclohexyl methacrylates, isobornyl acrylate, isobornyl methacrylates and 3,5-dimethyladamantyl acrylate.

In one procedure monomers are used which carry polar groups such as carboxyl radicals, sulfonic and phosphonic acid, hydroxyl radicals, lactam and lactone, N-substituted amide, N-substituted amine, carbamate, epoxy, thiol, alkoxy or cyano radicals, ethers or the like.

Moderate basic monomers are, for example, N,N-dialkyl-substituted amides, such as, for example, N,N-dimethylacrylamide, N,N-dimethylmethylmethacrylamide, N-tert-butylacryl-amide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl) methacrylamide, N-methylolacrylamide, N-(ethoxymethyl) acrylamide, N-isopropylacrylamide, this enumeration not being exhaustive.

Further preferred examples are hydroxyethyl acrylate, hydroxypropyl acrylate, hydroxyethyl methacrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate, 6-hydroxyhexyl methacrylate, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being exhaustive.

In one further very preferred procedure use is made as monomers of vinyl esters, vinyl ethers, vinyl halides, vinylidene halides, and vinyl compounds having aromatic rings and heterocycles in α-position. Here again, mention may be made, nonexclusively, of some examples: vinyl acetate, vinylformamide, vinylpyridine, ethyl vinyl ether, vinyl chloride, vinylidene chloride, and acrylonitrile.

Moreover, in a further procedure, use is made of photoinitiators having a copolymerizable double bond. Suitable photoinitiators include Norrish I and II photoinitiators. Examples include benzoin acrylate and an acrylated benzophenone from UCB (Ebecryl P 36®). In principle it is possible to copolymerize any photoinitiators which are known to the skilled worker and which are able to crosslink the polymer by way of a free-radical mechanism under UV irradiation. An overview of possible photoinitiators for use, which can be functionalized with a double bond, is given in Fouassier: "Photoinitiation, Photopolymerization and Photocuring: Fundamentals and Applications", Hanser-Verlag, Munich 1995. For further details recourse can be had to Carroy et al. in "Chemistry and Technology of UV and EB Formulation for Coatings, Inks and Paints", Oldring (ed.), 1994, SITA, London.

In another preferred procedure the comonomers described are admixed with monomers which possess a high static glass transition temperature. Suitable components include aromatic vinyl compounds, an example being styrene, in which the aromatic nuclei consist preferably of $C_4$ to $C_{18}$ units and may also include heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenylyl acrylate, 4-biphenylyl methacrylate, 2-naphthyl acrylate, 2-naphthyl methacrylate, and mixtures of these monomers, this enumeration not being exhaustive.

As a result of the increase in the aromatic fraction there is a rise in the refractive index of the PSA, and the scattering between LCD glass and PSA as a result, for example, of extraneous light is minimized.

For further development it is possible to admix resins to the PSAs. As tackifying resins for addition it is possible without exception to use all existing tackifier resins and those described in the literature. Representatives that may be mentioned include pinene resins, indene resins and rosins, their disproportionated, hydrogenated, polymerized, and esterified derivatives and salts, the aliphatic and aromatic hydrocarbon resins, terpene resins and terpene-phenolic resins, and also $C_5$, $C_9$, and other hydrocarbon resins. Any desired combinations of these and further resins may be used in order to adjust the properties of the resultant adhesive in accordance with requirements. Generally speaking it is possible to employ any resins which are compatible (soluble) with the polyacrylate in question: in particular, reference may be made to all aliphatic, aromatic and alkylaromatic hydrocarbon resins, hydrocarbon resins based on single monomers, hydrogenated hydrocarbon resins, functional hydrocarbon resins, and natural resins. Express reference may be made to the depiction of the state of the art in the "Handbook of Pressure Sensitive Adhesive Technology" by Donatas Satas (van Nostrand, 1989).

Here as well, the transparency is improved using, preferably, transparent resins which are highly compatible with the polymer. Hydrogenated or partly hydrogenated resins frequently feature these properties.

In addition it is possible optionally to add plasticizers, further fillers (such as, for example, fibers, carbon black, zinc oxide, chalk, solid or hollow glass beads, microbeads made of other materials, silica, silicates), nucleators, electrically conductive materials, such as, for example, conjugated polymers, doped conjugated polymers, metal pigments, metal particles, metal salts, graphite, etc., expandants, compounding agents and/or aging inhibitors, in the form of, for example, primary and secondary antioxidants or in the form of light stabilizers. For the case of the inventive embodiment of FIG. 2, the PSA (b) is equipped preferably with silver-colored and reflecting particles. Through the quantitative fraction it is possible to control the coloration and the degree of reflection.

In addition it is possible to admix crosslinkers and crosslinking promoters. Examples of suitable crosslinkers for electron beam crosslinking and UV crosslinking include difunctional or polyfunctional acrylates, difunctional or polyfunctional isocyanates (including those in block form), and difunctional or polyfunctional epoxides.

For optional crosslinking with UV light it is possible to add UV-absorbing photoinitiators to the PSAs. Useful photoinitiators whose use is very effective are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime, for example.

The abovementioned photoinitiators and others which can be used, and also others of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenylmorpholine ketone, aminoketone, azobenzoin, thioxanthone, hexaarylbisimidazole, triazine, or fluorenone, it being possible for each of these radicals to be additionally substituted by one or more halogen atoms and/or by one or more alkyloxy groups and/or by one or more amino groups or hydroxy groups. A representative overview is given by Fouassier: "Photoinitiation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (ed.), 1994, SITA, London.

Preparation Processes for the Acrylate PSAs

For the polymerization the monomers are chosen such that the resultant polymers can be used at room temperature or higher temperatures as PSAs, particularly such that the resulting polymers possess pressure sensitive adhesion properties in accordance with the "Handbook of Pressure Sensitive Adhesive Technology" by Donatas Satas (van Nostrand, N.Y. 1989).

In order to achieve a preferred polymer glass transition temperature $T_g$ of $\leq 25°$ C. for PSAs it is very preferred, in accordance with the comments made above, to select the monomers in such a way, and choose the quantitative composition of the monomer mixture advantageously in such a way, so as to result in the desired $T_g$ for the polymer in accordance with the Fox equation (E1) (cf. T. G. Fox, Bull. Am. Phys. Soc. 1 (1956) 123).

$$\frac{1}{T_g} = \sum_n \frac{w_n}{T_{g,n}} \tag{E1}$$

In this equation, n represents the serial number of the monomers used, $w_n$ the mass fraction of the respective monomer n (% by weight) and $T_{g,n}$ the respective glass transition temperature of the homopolymer of the respective monomer n, in K.

For the preparation of the poly(meth)acrylate PSAs it is advantageous to carry out conventional free-radical polymerizations. For the polymerizations which proceed free-radically it is preferred to employ initiator systems which also contain further free-radical initiators for the polymerization, especially thermally decomposing, free-radical-forming azo or peroxo initiators. In principle, however, all customary initiators which are familiar to the skilled worker for acrylates are suitable. The production of C-centered radicals is described in Houben Weyl Methoden der Organischen Chemie, Vol. E 19a, pp. 60-147. These methods are employed, preferentially, in analogy.

Examples of free-radical sources are peroxides, hydroperoxides, and azo compounds; some nonlimiting examples of typical free radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred version the free-radical initiator used is 1,1'-azobis(cyclohexane-carbonitrile) (Vazo 88™ from DuPont) or azodiisobutyronitrile (AIBN).

The average molecular weights $M_w$ of the PSAs formed in the free-radical polymerization are very preferably chosen such that they are situated within a range of 200 000 to 4 000 000 g/mol; specifically for further use as electrically conductive hot-melt PSAs with resilience, PSAs are prepared which have average molecular weights $M_w$ of 400 000 to 1 400 000 g/mol. The average molecular weight is determined by size exclusion chromatography (GPC) or matrix-assisted laser desorption/ionization mass spectrometry (MALDI-MS).

The polymerization may be conducted without solvent, in the presence of one or more organic solvents, in the presence of water, or in mixtures of organic solvents and water. The aim is to minimize the amount of solvent used. Suitable organic solvents are straight alkanes (e.g. hexane, heptane, octane, isooctane), aromatic hydrocarbons (e.g. benzene, toluene, xylene), esters (e.g. ethyl, propyl, butyl or hexyl acetate), halogenated hydrocarbons (e.g. chlorobenzene), alkanols (e.g. methanol, ethanol, ethylene glycol, ethylene glycol monomethyl ether), and ethers (e.g. diethyl ether, dibutyl ether) or mixtures thereof. A water-miscible or hydrophilic cosolvent may be added to the aqueous polymerization reactions in order to ensure that the reaction mixture is present in the form of a homogeneous phase during monomer conversion. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones and the like, and also derivatives and mixtures thereof.

The polymerization time—depending on conversion and temperature—is between 2 and 72 hours. The higher the reaction temperature which can be chosen, i.e., the higher the thermal stability of the reaction mixture, the shorter can be the chosen reaction time. As regards initiation of the polymerization, the introduction of heat is essential for the thermally decomposing initiators. For these initiators the polymerization can be initiated by heating to from 50 to 160° C., depending on initiator type.

For the preparation it can also be of advantage to polymerize the (meth)acrylate PSAs without solvent. A particularly suitable technique for use in this case is the prepolymerization technique. Polymerization is initiated with UV light but taken only to a low conversion of about 10-30%. The resulting polymer syrup can then be welded, for example, into films (in the simplest case, ice cubes) and then polymerized through to a high conversion in water. These pellets can subsequently be used as acrylic hot-melt adhesives, it being particularly preferred to use, for the melting operation, film materials which are compatible with the polyacrylate. For this preparation method as well it is possible to add the thermally conductive materials before or after the polymerization.

Another advantageous preparation process for the poly (meth)acrylate PSAs is that of anionic polymerization. In this case the reaction medium used preferably comprises inert solvents, such as aliphatic and cycloaliphatic hydrocarbons, for example, or else aromatic hydrocarbons.

The living polymer is in this case generally represented by the structure $P_L(A)$-Me, where Me is a metal from group I, such as lithium, sodium or potassium, and $P_L(A)$ is a growing polymer from the acrylic monomers. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium, and octyllithium, though this enumeration makes no claim to completeness. Furthermore, initiators based on samarium complexes are known for the polymerization of acrylates (Macromolecules, 1995, 28, 7886) and can be used here.

It is also possible, furthermore, to employ difunctional initiators, such as 1,1,4,4-tetraphenyl-1,4-dilithiobutane or 1,1,4,4-tetraphenyl-1,4-dilithioisobutane, for example. Coinitiators can likewise be employed. Suitable coinitiators include lithium halides, alkali metal alkoxides, and alkylaluminum compounds. In one very preferred version the ligands and coinitiators are chosen so that acrylic monomers, such as n-butyl acrylate and 2-ethylhexyl acrylate, for example, can be polymerized directly and do not have to be generated in the polymer by transesterification with the corresponding alcohol.

Methods suitable for preparing poly(meth)acrylate PSAs with a narrow molecular weight distribution also include controlled free radical polymerization methods. In that case it is preferred to use, for the polymerization, a control reagent of the general formula:

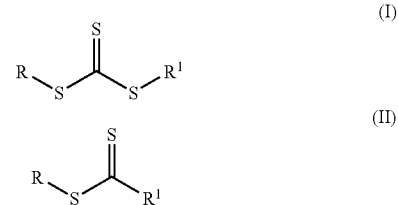

in which R and $R^1$, chosen independently of one another or identical, are branched and unbranched $C_1$ to $C_{18}$ alkyl radicals; $C_3$ to $C_{18}$ alkenyl radicals; $C_3$ to $C_{18}$ alkynyl radicals;

$C_1$ to $C_{18}$ alkoxy radicals;

$C_3$ to $C_{18}$ alkynyl radicals; $C_3$ to $C_{18}$ alkenyl radicals; $C_1$ to $C_{18}$ alkyl radicals substituted by at least one OH group or a halogen atom or a silyl ether;

$C_2$-$C_{18}$ heteroalkyl radicals having at least one oxygen atom and/or one NR* group in the carbon chain, R* being any radical (particularly an organic radical);

$C_3$-$C_{18}$ alkynyl radicals, $C_3$-$C_{18}$ alkenyl radicals, $C_1$-$C_{18}$ alkyl radicals substituted by at least one ester group, amine group, carbonate group, cyano group, isocyano group and/or epoxy group and/or by sulfur;

$C_3$-$C_{12}$ cycloalkyl radicals;

$C_6$-$C_{18}$ aryl or benzyl radicals;

hydrogen.

Control reagents of type (I) are preferably composed of the following further-restricted compounds:

halogen atoms therein are preferably F, Cl, Br or I, more preferably Cl and Br. Outstandingly suitable alkyl, alkenyl and alkynyl radicals in the various substituents include both linear and branched chains.

Examples of alkyl radicals containing 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl, and octadecyl.

Examples of alkenyl radicals having 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl, and oleyl.

Examples of alkynyl having 3 to 18 carbon atoms are propynyl, 2-butynyl, 3-butynyl, n-2-octynyl, and n-2-octadecynyl.

Examples of hydroxy-substituted alkyl radicals are hydroxypropyl, hydroxybutyl, and hydroxyhexyl.

Examples of halogen-substituted alkyl radicals are dichlorobutyl, monobromobutyl, and trichlorohexyl.

An example of a suitable $C_2$-$C_{18}$ heteroalkyl radical having at least one oxygen atom in the carbon chain is —$CH_2$—$CH_2$—O—$CH_2$—$CH_3$.

Examples of $C_3$-$C_{12}$ cycloalkyl radicals include cyclopropyl, cyclopentyl, cyclohexyl, and trimethylcyclohexyl.

Examples of $C_6$-$C_{18}$ aryl radicals include phenyl, naphthyl, benzyl, 4-tert-butylbenzyl, and other substituted phenyls, such as ethyl, toluene, xylene, mesitylene, isopropylbenzene, dichlorobenzene or bromotoluene.

The above enumerations serve only as examples of the respective groups of compounds, and make no claim to completeness.

Other compounds which can be used as control reagents include those of the following types:

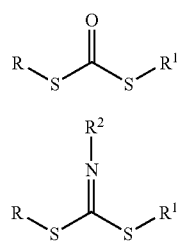

(III)

(IV)

where $R^2$, again independently from R and $R^1$, may be selected from the group recited above for these radicals.

In the case of the conventional 'RAFT' process, polymerization is generally carried out only up to low conversions (WO 98/01478 A1) in order to produce very narrow molecular weight distributions. As a result of the low conversions, however, these polymers cannot be used as PSAs and in particular not as hot-melt PSAs, since the high fraction of residual monomers adversely affects the technical adhesive properties; the residual monomers contaminate the solvent recyclate in the concentration operation; and the corresponding self-adhesive tapes would exhibit very high outgassing behavior. In order to circumvent this disadvantage of low conversions, the polymerization in one particularly preferred procedure is initiated two or more times.

As a further controlled free radical polymerization method it is possible to carry out nitroxide-controlled polymerizations. For free-radical stabilization, in a favorable procedure, use is made of nitroxides of type (Va) or (Vb):

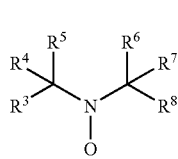

(Va)

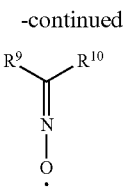

(Vb)

where $R^3$, $R^4$, $R^5$, $R^6$, $R^7$, $R^8$, $R^9$, and $R^{10}$ independently of one another denote the following compounds or atoms:
i) halides, such as chlorine, bromine or iodine, for example,
ii) linear, branched, cyclic, and heterocyclic hydrocarbons having 1 to 20 carbon atoms, which may be saturated, unsaturated or aromatic,
iii) esters —$COOR^{11}$, alkoxides —$OR^{12}$ and/or phosphonates —$PO(OR^{13})_2$, where $R^{11}$, $R^{12}$ or $R^{13}$ stand for radicals from group ii).

Compounds of type (Va) or (Vb) can also be attached to polymer chains of any kind (primarily such that at least one of the abovementioned radicals constitutes a polymer chain of this kind) and may therefore be used for the synthesis of polyacrylate PSAs. With greater preference, compounds of the following types are used as controlled regulators for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy pyrrolidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide
N-tert-butyl 1-(2-naphthyl)-2-methylpropyl nitroxide
N-tert-butyl 1-diethylphosphono-2,2-dimethylpropyl nitroxide
N-tert-butyl 1-dibenzylphosphono-2,2-dimethylpropyl nitroxide
N-(1-phenyl-2-methylpropyl)1-diethylphosphono-1-methylethyl nitroxide
di-t-butyl nitroxide
diphenyl nitroxide
t-butyl t-amyl nitroxide.

A series of further polymerization methods in accordance with which the PSAs can be prepared by an alternative procedure can be chosen from the prior art:

U.S. Pat. No. 4,581,429 A discloses a controlled-growth free radical polymerization process which uses as its initiator a compound of the formula R'R"N—O—Y, in which Y is a free radical species which is able to polymerize unsaturated monomers. In general, however, the reactions have low conversion rates. A particular problem is the polymerization of acrylates, which takes place only with very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific free radical compounds, such as phosphorus-containing nitroxides based on imidazolidine, for example, are employed. WO 98/44008 A1 discloses specific nitroxyls based on morpholines, piperazinones, and piperazinediones. DE 199 49 352 A1 describes heterocyclic alkoxyamines as regulators in controlled-growth free radical polymerizations. Corresponding further developments of the alkoxyamines or of the corresponding free nitroxides improve the efficiency for the preparation of polyacrylates (Hawker, paper to the National Meeting of the American Chemical Society, Spring 1997; Husemann, paper to the IUPAC World-Polymer Meeting 1998, Gold Coast).

As a further controlled polymerization method, atom transfer radical polymerization (ATRP) can be used advantageously to synthesize the polyacrylate PSAs, in which case use is made preferably as initiator of monofunctional or difunctional secondary or tertiary halides and, for abstracting the halide(s), of complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. No. 5,945,491 A, U.S. Pat. No. 5,854,364 A and U.S. Pat. No. 5,789,487 A.

Coating Processes, Equipment of the Carrier Material

For production, in one preferred embodiment the PSA is coated from solution. For thermally crosslinking PSAs, heat is supplied, in a drying tunnel for example, to remove the solvent and initiate the crosslinking reaction.

The polymers described above can also be coated, furthermore, as hotmelt systems (i.e., from the melt). For the preparation process it may therefore be necessary to remove the solvent from the PSA. In this case it is possible in principle to use any of the techniques known to the skilled worker. One very preferred technique is that of concentration using a single-screw or twin-screw extruder. The twin-screw extruder can be operated corotatingly or counterrotatingly. The solvent or water is preferably distilled off over two or more vacuum stages. Counterheating is also carried out depending on the distillation temperature of the solvent. The residual solvent fractions amount to preferably <1%, more preferably <0.5%, and very preferably <0.2%. Further processing of the hotmelt takes place from the melt.

For coating as a hotmelt it is possible to employ different coating processes. In one version the PSAs are coated by a roll coating process. Different roll coating processes are described in the "Handbook of Pressure Sensitive Adhesive Technology", by Donatas Satas (van Nostrand, New York 1989). In another version, coating takes place via a melt die. In a further preferred process, coating is carried out by extrusion. Extrusion coating is performed preferably using an extrusion die. The extrusion dies used may come advantageously from one of the three following categories: T-dies, fishtail dies and coathanger dies. The individual types differ in the design of their flow channels. Through the coating it is also possible for the PSAs to undergo orientation.

In addition it may be necessary for the PSA to be crosslinked. In one preferred version, crosslinking takes place with actinic radiation.

For UV crosslinking irradiation is carried out with short-wave ultraviolet irradiation in a wavelength range from 200 to 400 nm, depending on the UV photoinitiator used; in particular, irradiation is carried out using high-pressure or medium-pressure mercury lamps at an output of 80 to 240 W/cm. The irradiation intensity is adapted to the respective quantum yield of the UV photoinitiator and the degree of crosslinking that is to be set.

Furthermore, in one preferred embodiment, it is possible to crosslink the PSAs using electron beams. Typical irradiation equipment which can be employed includes linear cathode systems, scanner systems, and segmented cathode systems, where electron beam accelerators are employed. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably between 80 kV and 300 kV. The scatter doses employed range between 5 to 150 kGy, in particular between 20 and 100 kGy. It is also possible to employ both crosslinking processes, or other processes allowing high-energy irradiation.

Figure 3:
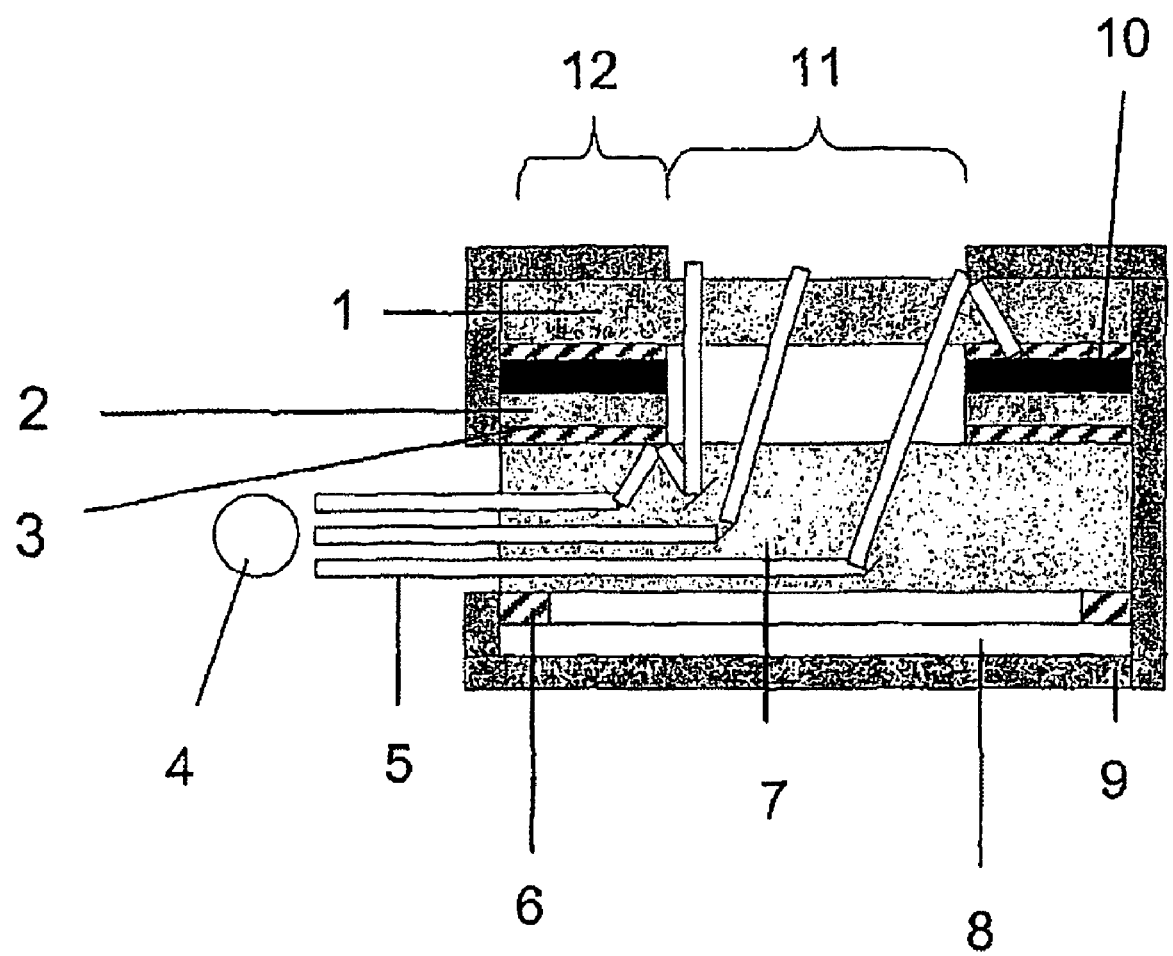
FIG. 3 depicts a liquid crystal display (LCD) incorporating a pressure-sensitive adhesive tape according to the present invention.

The invention further provides for the use of the inventive double-sided pressure-sensitive adhesive tapes for adhesive bonding in LCD displays, in accordance for example with FIG. 3.

In FIG. 3 the definitions of the references are as follows:

1 LCD glass
2 reflecting layer
3 adhesive layer
4 LED
5 light beams
6 double-sided adhesive tape
7 optical wave guide
8 reflective film
9 LCD metal frame
10 black absorbing layer
11 visible region
12 "blind" region For use as pressure-sensitive adhesive tape it is possible for the double-sided pressure-sensitive adhesive tapes to have been lined with one or two release films or release papers. In one preferred embodiment use is made of siliconized films or papers, such as glassine, HDPE or LDPE coated papers, for example.

EXAMPLES

The invention is described below, without wishing any unnecessary restriction to result from the choice of the examples.

The following test methods were employed.

Test Methods

A. Refractive Index

The refractive index of the PSA was measured in a 25 μm thick film using the Optronic instrument from Krüss at 25° C. under white light (λ=550 nm±150 nm) according to the Abbé principle. For temperature stabilization the instrument was operated in conjunction with a thermostat from Lauda.

B. Transmittance

The transmittance was measured in the wavelength range from 190 to 900 nm using a Uvikon 923 from Biotek Kontron on a sample film 100 μm thick, applied to 50 μm polyolefin film, with measurement taking place against an uncoated polyolefin film reference.

Polymer 1

A 200 L reactor conventional for free-radical polymerizations was charged with 2400 g of acrylamide, 64 kg of 2-ethylhexyl acrylate, 6.4 kg of N-isopropylacrylamide and 53.3 kg of acetone/isopropanol (95:5). After nitrogen gas had been passed through the reactor for 45 minutes with stirring, the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h, dilution was carried out with 15 kg each time of acetone/isopropanol (95:5). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and the reaction mixture cooled to room temperature.

Polymer 2

A 200 L reactor conventional for free-radical polymerizations was charged with 1200 g of acrylamide, 74 kg of 2-ethylhexyl acrylate, 4.8 kg of N-isopropylacrylamide and 53.3 kg of acetone/isopropanol (95:5). After nitrogen gas had been passed through the reactor for 45 minutes with stirring, the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h, dilution was carried out with 15 kg each time of acetone/isopropanol (95:5). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and the reaction mixture cooled to room temperature.

Crosslinking of the PSAs in the production process with a dose of 25 kGy at an acceleration voltage of 200 kV.

Preparation of Polymer 3:

Preparation of Nitroxides:

(a) Preparation of the Difunctional Alkoxyamine (NIT 1):

The preparation took place in analogy with the experimental protocol from Journal of American Chemical Society, 1999, 121(16), 3904. Starting materials used were 1,4-divinylbenzene and nitroxide (NIT 4).

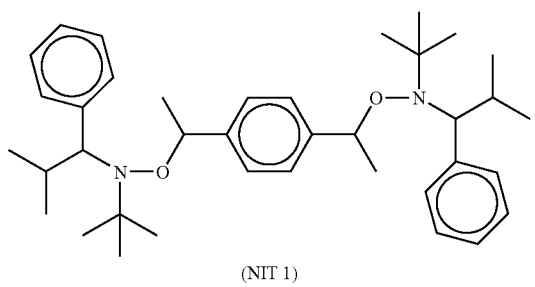

(NIT 1)

(b) Preparation of the Nitroxide (NIT 2) (2,2,5-trimethyl-4-phepyl-3-azahexane-3-nitroxide):

The preparation took place in analogy with the experimental protocol from Journal of American Chemical Society, 1999, 121(16), 3904.

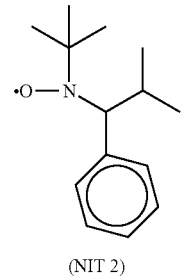

(NIT 2)

General procedure: A mixture of the alkoxyamine (NIT 1) and the nitroxide (NIT 2) (10 mol % with respect to alkoxyamine (NIT 1)) is mixed with the monomer B (for the subsequent polymer block P(B)), degassed a number of times with cooling to −78° C., and then heated to 110° C. under pressure in a closed vessel. After a reaction time of 36 h the monomer A (for the subsequent polymer block P(A)) is added and polymerization is continued at this temperature for 24 hours.

In analogy to the general procedure for the polymerization, 0.739 g of the difunctional initiator (NIT 1), 0.0287 g of the free nitroxide (NIT 2), 128 g of isobornyl acrylate and 192 g of 2-ethylhexyl acrylate, as monomers (B), and 180 g of o-methoxystyrene, as monomer (A), were used. The polymer was isolated by cooling to room temperature, dissolving the block polymer in 750 ml of dichloromethane and then precipitating it from 6.0 l of methanol (cooled to −78° C.) with vigorous stirring. The precipitate was filtered off over a cooled frit.

The product obtained was concentrated in a vacuum drying cabinet at 10 torr and 45° C. for 12 hours.

The block copolymer was coated from the melt onto a Saran-primed PET carrier film 23 μm thick or onto a release paper provided with a 1.5 g/m² application of silicone. Subsequent heating took place in an IR zone at 120° C. for 80 seconds. The application rate was 50 g/m².

Results

Following the production of the test specimens, first of all the refractive index was measured for all of polymers 1 to 3. For this purpose the polymers were coated from solution onto release paper (50 g/m² application rate after drying). In table 1 the refractive indices measured are compiled. All values were determined at room temperature.

TABLE 1

| Example | Refractive index $n_d$ (test A) |
|---------|-------------------------------|
| 1 | 1.45 |
| 2 | 1.45 |
| 3 | 1.52 |

The invention claimed is:

1. A pressure-sensitive adhesive tape comprising:
   (a) at least one PET film carrier having two faces and colored black;
   (b) a first pressure-sensitive adhesive covering a first of said two faces and transparent;
   (c) a second pressure-sensitive adhesive covering a second of said two faces; and (d) a silvery-colored reflective layer positioned between said first pressure-sensitive adhesive and said at least one carrier.

2. An LCD display comprising a pressure-sensitive adhesive according to claim 1.

3. An electronic device comprising an LCD display according to claim 2.

* * * * *

UNITED STATES PATENT AND TRADEMARK OFFICE
CERTIFICATE OF CORRECTION

PATENT NO. : 7,514,142 B2  
APPLICATION NO. : 10/528291  
DATED : April 7, 2009  
INVENTOR(S) : Husemann et al.

Page 1 of 1

It is certified that error appears in the above-identified patent and that said Letters Patent is hereby corrected as shown below:

In the Specification

Column 3, line 63, "$\geqq$" should read -- $\geq$ --.

Column 6, line 33, "$\leqq$" should read -- $\leq$ --.

Signed and Sealed this  
Fourth Day of March, 2014

Michelle K. Lee  
*Deputy Director of the United States Patent and Trademark Office*